United States Patent
Walsh et al.

(10) Patent No.: US 12,198,067 B2
(45) Date of Patent: Jan. 14, 2025

(54) SYSTEMS AND METHODS FOR SYNTHESIZING CROSS DOMAIN COLLECTIVE INTELLIGENCE

(71) Applicant: Accenture Global Solutions Limited, Dublin (IE)

(72) Inventors: Paul Walsh, Cork (IE); Md. Faisal Zaman, Drumcondra (IE)

(73) Assignee: Accenture Global Solutions Limited, Dublin (IE)

( * ) Notice: Subject to any disclaimer, the term of this patent is extended or adjusted under 35 U.S.C. 154(b) by 841 days.

(21) Appl. No.: 17/305,786

(22) Filed: Jul. 14, 2021

(65) Prior Publication Data
US 2023/0018116 A1    Jan. 19, 2023

(51) Int. Cl.
   G06N 5/022   (2023.01)
   G06F 16/907  (2019.01)
   G06F 16/93   (2019.01)
   G06F 21/60   (2013.01)
   G06F 40/20   (2020.01)
   G06N 5/04    (2023.01)

(52) U.S. Cl.
   CPC ......... *G06N 5/022* (2013.01); *G06F 16/907* (2019.01); *G06F 16/93* (2019.01); *G06F 21/60* (2013.01); *G06F 40/20* (2020.01); *G06N 5/04* (2013.01)

(58) Field of Classification Search
   CPC ....... G06N 5/022; G06N 5/04; G06F 16/907; G06F 16/93; G06F 40/20; G06F 21/60
   See application file for complete search history.

(56) References Cited

U.S. PATENT DOCUMENTS

| | | | |
|---|---|---|---|
| 2009/0150346 A1* | 6/2009 | Soderstrom | H04M 7/0024 |
| 2018/0018590 A1* | 1/2018 | Szeto | G16H 50/20 |
| 2020/0349180 A1* | 11/2020 | Kempf | G06F 16/367 |
| 2021/0166157 A1* | 6/2021 | Bhowmick | G06N 3/04 |
| 2022/0171873 A1* | 6/2022 | Lundbæk | G06F 16/9538 |
| 2022/0277149 A1* | 9/2022 | Altschul | G06N 7/01 |
| 2022/0391595 A1* | 12/2022 | Shevelev | G06N 3/08 |

FOREIGN PATENT DOCUMENTS

WO    WO-2021080577 A1 *   4/2021    ......... G06F 21/6254

OTHER PUBLICATIONS

Swanson, Don R., et al., "An interactive system for finding complementary literatures: a stimulus to scientific discovery," Artificial Intelligence 91, 1997, pp. 183-203.

* cited by examiner

*Primary Examiner* — Hares Jami
(74) *Attorney, Agent, or Firm* — Polsinelli PC

(57) ABSTRACT

In some implementations, a collaborative knowledge system may receive a first set and a second set of privatized embeddings. The first set of privatized embeddings may be generated by a local model based on a first set of private documents associated with a first knowledge domain. The second set of privatized embeddings may be generated by a local model based on a second set of private documents associated with a second, different knowledge domain. The collaborative knowledge system may train, based on the first and second sets of privatized embeddings, a centralized model. The collaborative knowledge system may receive a query associated with the first knowledge domain or the second knowledge domain. The collaborative knowledge system may generate a response to the query based on processing the query with the centralized model. The collaborative knowledge system may provide the response to the query to a user device.

20 Claims, 10 Drawing Sheets

SYSTEMS AND METHODS FOR SYNTHESIZING CROSS DOMAIN COLLECTIVE INTELLIGENCE

BACKGROUND

Word embedding may include a language modeling and/or a feature learning technique in natural language processing (NLP) where characters, words, and/or phrases are mapped to vectors of real numbers in a dimensional metric space.

SUMMARY

Some implementations described herein relate to a method. The method may include receiving, by a system, a first set of privatized embeddings and a second set of privatized embeddings, where the first set of privatized embeddings are generated by a first local model based on a first set of private documents associated with a first knowledge domain, and where the second set of privatized embeddings are generated by a second local model based on a second set of private documents associated with a second knowledge domain that is different from the first knowledge domain. The method may include training, by the system and based on the first set of privatized embeddings and the second set of privatized embeddings, a centralized model to generate a trained centralized model. The method may include receiving, by the system and from a user device, a query associated with one or more of the first knowledge domain or the second knowledge domain. The method may include generating, by the system, a response to the query based on processing the query with the trained centralized model. The method may include providing, by the system, the response to the query to the user device.

Some implementations described herein relate to a system. The system may include one or more memories and one or more processors coupled to the one or more memories. The one or more processors may be configured to receive a centralized model. The one or more processors may be configured to receive, from a user device, a query associated with one or more of the first knowledge domain or the second knowledge domain. The one or more processors may be configured to generate a response to the query based on processing the query with the centralized model. The one or more processors may be configured to provide the response to the query to the user device.

Some implementations described herein relate to a non-transitory computer-readable medium that stores a set of instructions for a system. The set of instructions, when executed by one or more processors of the system, may cause the system to receive a first set of privatized embeddings and a second set of privatized embeddings. The set of instructions, when executed by one or more processors of the system, may cause the system to train, based on the first set of privatized embeddings and the second set of privatized embeddings, a centralized model to generate a trained centralized model. The set of instructions, when executed by one or more processors of the system, may cause the system to receive, from a user device, a query associated with one or more of the first knowledge domain or the second knowledge domain. The set of instructions, when executed by one or more processors of the system, may cause the system to generate a response to the query based on processing the query with the trained centralized model. The set of instructions, when executed by one or more processors of the system, may cause the system to provide the response to the query to the user device.

DETAILED DESCRIPTION

Figure 1A:
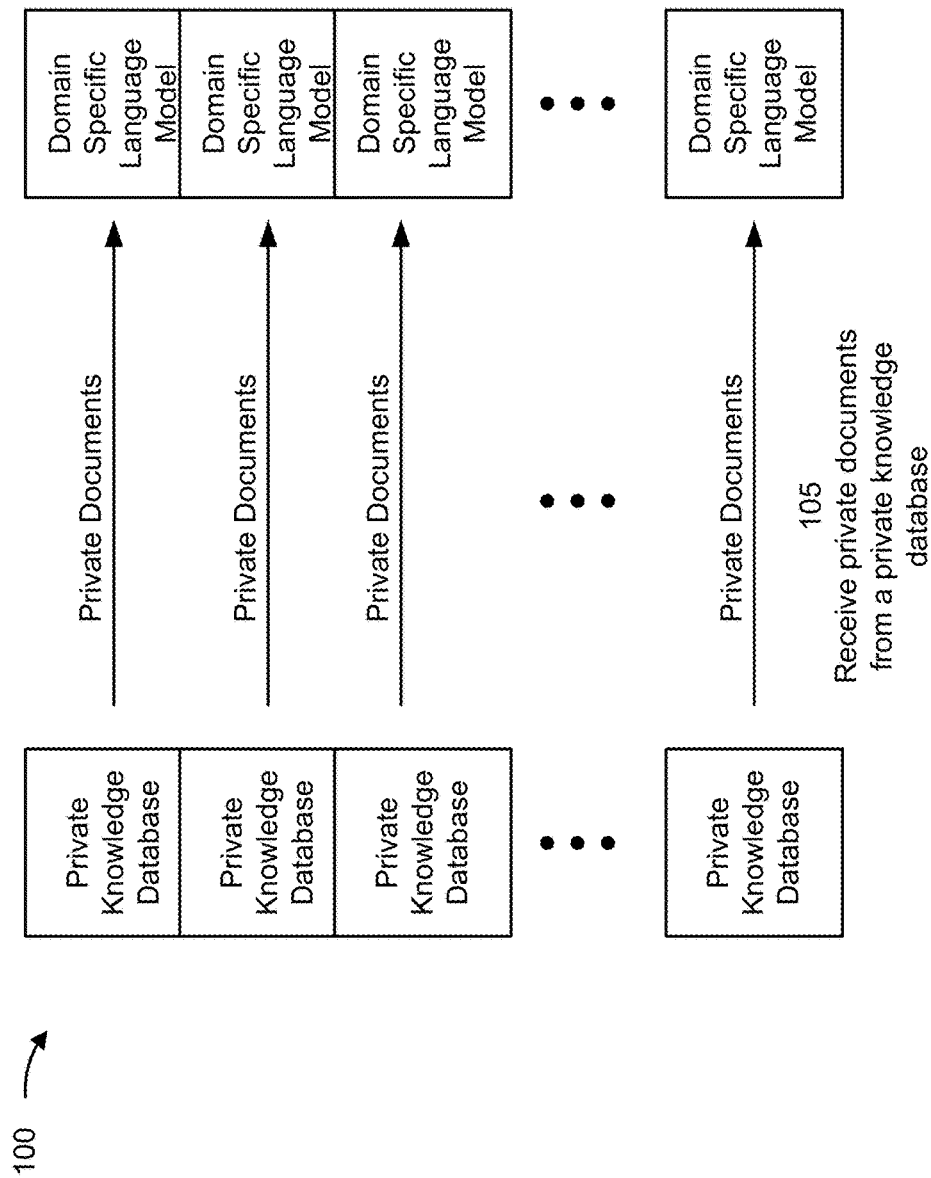
FIGS. 1A-1G are diagrams of an example implementation described herein.

The following detailed description of example implementations refers to the accompanying drawings. The same reference numbers in different drawings may identify the same or similar elements.

A knowledge worker may be an individual who works with information (e.g., rather than physical objects of labor). For example, a knowledge worker may be an individual who creates, manages, shares, receives, uses, acts on, and/or reacts to information in the course of the knowledge worker's daily work. A knowledge worker may spend a significant amount of time (e.g., an average of 20.5 hours per week) searching for information, ingesting information, synthesizing new ideas, and generating new content. Inefficiencies in these tasks may contribute to increased costs and lost productivity.

Commonly, a knowledge worker will specialize in a particular subject area (referred to herein as a knowledge domain). For example, a knowledge worker may specialize in a knowledge domain associated with a particular area of science, a particular area of mathematics, or a particular area of history, among other examples. To specialize in a knowledge domain, a knowledge worker may spend an enormous amount of time researching, learning, and understanding a vast amount of information related to the knowledge domain, which may result in the knowledge worker having a relatively limited knowledge of information related to other knowledge domains. Therefore, a knowledge worker specializing in one knowledge domain may be unaware of information developed in another knowledge domain that may be of value to the knowledge worker.

The lack of shared information across knowledge domains may result in knowledge workers failing to discover many new knowledge insights (e.g., concepts, ideas, and/or theories, among other examples). Further, each knowledge domain may be associated with a specialized vocabulary that is unique to each knowledge domain. For example, a term may have one meaning within one knowledge domain and may not be used or may have a different meaning within another knowledge domain. The specialized vocabularies may further inhibit the sharing of information across knowledge domains as a knowledge worker in one knowledge domain may be unaware of a meaning of attributed to a term used by a knowledge worker in another knowledge domain. As a result, information may be misinterpreted, or the knowledge worker will spend a significant amount of time learning and translating the language used by the other knowledge domain to the language used by the knowledge domain of the knowledge worker. Further, the knowledge worker may have to overcome subjective internal cognitive and confirmation bias when synthesizing the information generated by a knowledge worker in another knowledge domain.

In some cases, a system may be used to codify information generated by a knowledge worker using objective systematic representations. The system may computationally manipulate the representations to generate new knowledge insights. However, the system may require a large amount of training data, may take a relatively long time to train, and may utilize hundreds, thousands, and/or tens of thousands of parameters to computationally manipulate the representations, which may consume significant amounts of computer resources (e.g., processing resources, memory resources, and/or communication resources, among other examples). Further, the system may be unable to identify and/or protect sensitive information (e.g., classified information, trade secret information, and/or personally identifiable information, among other examples) included in a document; may not be specific to a particular group of knowledge domains, an organization, and/or a particular project; and may not provide information explaining a context or a basis for the new knowledge insight.

Some implementations described herein relate to a collaborative knowledge system that uses information from a diverse set of knowledge areas to generate new knowledge insights. For example, the collaborative knowledge system may receive a first set of privatized embeddings and a second set of privatized embeddings. The first set of privatized embeddings may be generated by a first local model based on a first set of private documents associated with a first knowledge domain. The second set of privatized embeddings may be generated by a second local model based on a second set of private documents associated with a second, different knowledge domain. The collaborative knowledge system may train, based on the first set of privatized embeddings and the second set of privatized embeddings, a centralized model to generate a trained centralized model. The collaborative knowledge system may receive, from a user device, a query associated with one or more of the first knowledge domain or the second knowledge domain. The collaborative knowledge system may generate a response to the query based on processing the query with the trained centralized model and may provide the response to the query to the user device.

In this way, the collaborative knowledge system may be tailored to a particular group of knowledge domains, an organization, and/or a particular project; may enable the sharing of information across a diverse set of knowledge areas; may generate new knowledge insights based on the shared information; may provide additional information explaining a context and/or a basis for the new knowledge insights; and/or may protect sensitive information.

FIGS. 1A-1G are diagrams of an example implementation 100 associated with synthesizing cross domain collective intelligence. As shown in FIGS. 1A-1G, example implementation 100 includes a collaborative knowledge system associated with a plurality of domain specific language models (e.g., included on one or more user devices associated with one or more knowledge workers), a plurality of private knowledge databases, and a public knowledge database. These devices are described in more detail below in connection with FIG. 2 and FIG. 3.

As shown in FIG. 1A, and by reference number 105, a group of domain specific language models may each receive a respective set of private documents from a private knowledge database. In some implementations, a domain specific language model may include a transformer-based deep learning neural network architecture. For example, the domain specific language model may include an autoregressive language model (e.g., a generative pre-trained transformer (GPT) language prediction model) that uses deep learning to produce text in response to a query (e.g., to produce an answer to a question and/or to produce a reply to a comment, among other examples).

A private document may comprise a document (e.g., a research paper, an article, a blog post, a web page, and/or another type of document) that is associated with a knowledge worker and/or is not publicly available. For example, a private document may include a document that includes sensitive information (e.g., information classified as sensitive by a government entity, trade secret information, proprietary information, and/or personally identifiable information, among other examples), a personal document, and/or an unpublished document, among other examples.

A set of private documents received by a domain specific language model may include one or more private documents associated with a knowledge worker that specializes in a particular knowledge domain. For example, the knowledge worker specialized in a particular knowledge domain may obtain and/or create a group of private documents. The knowledge worker may store the group of private documents in a private knowledge database (e.g., in a data structure stored in a memory of a user device associated with the knowledge worker).

In some implementations, the domain specific language model may receive a set of private documents from the private knowledge database based on input received from the knowledge worker. For example, the knowledge worker may select (e.g., via a user interface provided by a client device associated with the knowledge worker and/or the domain specific language model) a set of documents included in the private knowledge database. The knowledge worker may select the set of documents based on a project the knowledge worker is currently working on and/or research the knowledge is currently performing, among other examples. The private knowledge database may obtain the set of private documents from the private knowledge database based on the selection of the set of documents by the knowledge worker.

Alternatively, and/or additionally, the domain specific language model may automatically select the set of private documents. As an example, the knowledge worker may input (e.g., via a user interface) information identifying a particular topic and/or a particular project, among other examples. The domain specific language model may identify a set of private documents from the private knowledge database based on the information input by the knowledge worker.

For example, a private document included in the private knowledge database may be associated with information (e.g., metadata and/or keywords, among other examples) indicating one or more topics associated with the document. The domain specific language model may identify the set of documents based on the set of documents being associated with a topic related to the information input by the knowledge worker. The domain specific language model may obtain the set of documents from the private knowledge database based on the set of documents being associated with the topic. Alternatively, and/or additionally, the domain specific language model may obtain all of the private documents included in the private knowledge database.

Figure 1B:
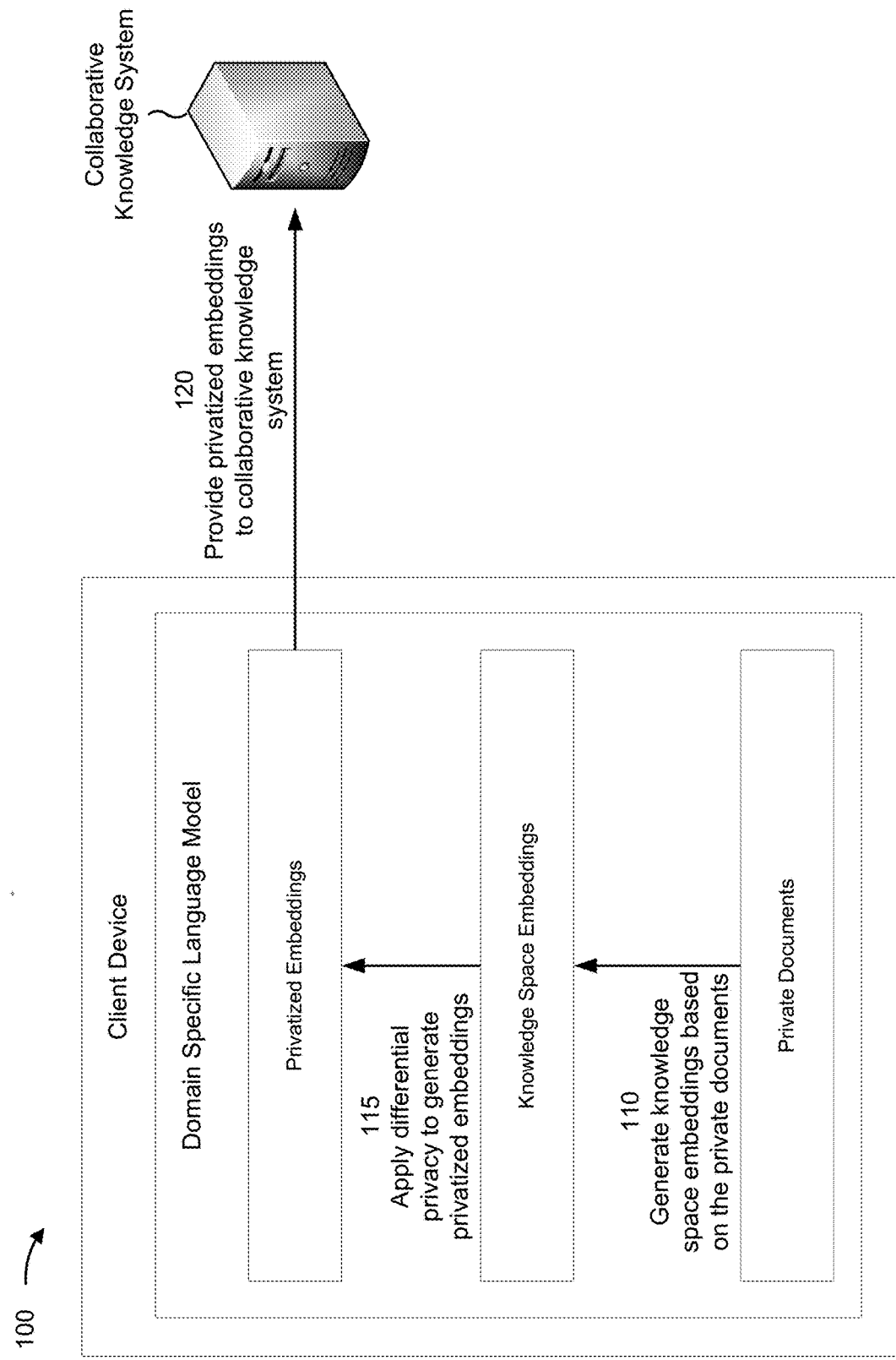

As shown in FIG. 1B, and by reference number 110, a domain specific language model, of the group of domain specific language models, may generate a set of knowledge space embeddings based on the private documents. The knowledge space embeddings may capture the semantics of information included in the set of private documents.

In some implementations, the domain specific language model may perform preprocessing on the set of private documents. The domain specific language model may perform the preprocessing based on a natural language processing (NLP) technique. For example, the domain specific language model may convert text to lowercase, remove punctuation, remove stop words, strip white space, perform stemming, perform lemmatization, spell out abbreviations and acronyms, and/or the like. In some implementations, the domain specific language model may remove sparse words, such as words that are uncommon (e.g., according to a knowledge domain-specific corpus). Preprocessing for NLP may improve accuracy of NLP and may conserve computing resources that would otherwise be used to perform NLP in a less efficient fashion for an un-preprocessed set of private documents.

In some implementations, domain specific language model may execute a first NLP technique for analyzing unstructured documents. For example, the domain specific language model may analyze unstructured notes and/or other types of unstructured documents using a token-based NLP technique (e.g., a technique using regular expressions), a category-based NLP technique (e.g., a named entity recognition (NER) technique), and/or an approximation-based NLP technique (e.g., a fuzzy text search technique), among other examples. Additionally, or alternatively, the domain specific language model may analyze structured documents (e.g., test data) using a second NLP technique (e.g., a metadata-based NLP technique and/or a similar type of technique).

In some implementations, the domain specific language model may execute a token-based NLP technique, such as a technique using regular expressions, to generate the embeddings. For example, the domain specific language model may reference a data structure (e.g., a database, a table, and/or a list, among other examples) that stores regular expressions (e.g., regular expressions associated with the knowledge domain of the knowledge worker) that may be used to identify a feature (e.g., a topic, an issue, and/or a subject area, among other examples) associated with a private document. The domain specific language model may use the regular expressions to identify the feature based on comparing the regular expressions and information included in the private document.

Additionally, or alternatively, the domain specific language model may execute an approximation-based NLP technique, such as a fuzzy text search technique, to identify the features. For example, the domain specific language model may execute an approximation-based NLP technique to identify data that satisfies a threshold level of similarity with data stored in a data structure. In this case, the domain specific language model may set a threshold level of similarity (e.g., a percentage and/or a number of characters, among other examples), and may compare information included in the private documents to information stored in the data structure. If the domain specific language model determines that the threshold level of similarity is satisfied, the domain specific language model may identify the information as information identifying the feature.

The domain specific language model may utilize an NLP technique and may generate a set of values (e.g., a set of knowledge space embeddings) identifying the features associated with the set of private documents. In some implementations, the set of knowledge space embeddings may include a vector space representation of the set of private documents. The vector space representation may include a vector associated with a private document. The vector may include one or more dimensions (e.g., one or more values). In some implementations, a quantity of dimensions may correspond to a quantity of terms (e.g., phrases, keywords, single words, and/or characters, among other examples) included in a data structure (e.g., a data structure storing terms included in a vocabulary associated with the knowledge domain). A dimension may represent a specific term. If the term is included in the private document, the value of the dimension may be a non-zero value. In some implementations, the value of the dimension may be determined based on a quantity of times the term appears in the private document, a relevance of the term to a particular topic or issue, and/or a term frequency-inverse document frequency weight, among other examples.

In some implementations, the domain specific language model may use multiple NLP techniques, and may filter outputs of the multiple NLP techniques into a single set of values identifying the features (e.g., a set of knowledge space embeddings). For example, the domain specific language model may identify a first set of values using a first one or more NLP techniques. Additionally, the domain specific language model may identify a second set of values using a second one or more NLP techniques. In some implementations, a mixture of overlapping values and conflicting values may occur. In these implementations, the domain specific language model may address the conflicting values by filtering the first set of values and the second set of values into a third set of values that excludes duplicate values, excludes conflicting values (e.g., by selecting one value, of two conflicting values, using a rule, such a threshold), and/or the like. The domain specific language model may use the third set of values as the set of knowledge space embeddings.

In some implementations, the domain specific language model may execute one or more of the above-mentioned NLP techniques on a particular type of private document and/or on a particular field or group of fields within a private document, among other examples. Additionally, or alternatively, the domain specific language model may take an average, or a weighted average, of the outputs of the one or more NLP techniques being deployed to identify the features. As an example, the domain specific language model may assign a weight to an output associated with each additional NLP technique and may take an average or a weighted average to identify the features. The domain specific language model may generate the knowledge space embeddings based on the identified features.

In some implementations, the knowledge space embeddings include contextual embeddings. The contextual embeddings may assign each term a representation based on the term's context within a private document. In this way, the contextual embeddings may indicate uses of the term within the particular knowledge domain associated with the domain specific language model. In this way, the knowledge space embeddings may encode knowledge that can be transferred to another knowledge domain when the term is given a different meaning and/or used in a different context in a private document associated with the other knowledge domain.

In some implementations, each domain specific language model, of the group of domain specific language models, may generate a respective set of knowledge space embeddings in a manner similar to that described above.

As shown by reference number 115, the domain specific language model may apply differential privacy to the set of knowledge space embeddings to generate a set of privatized embeddings. The domain specific language model may apply differential privacy to the set of knowledge space embeddings to prevent the sharing of sensitive information included in the set of private documents. In some implementations, the domain specific language model may apply differential privacy to the set of knowledge space embeddings based on generating the vector space representations included in the set of knowledge space embeddings. In some implementations, the domain specific language model may apply differential privacy to the set of knowledge space embeddings based on encrypting the set of knowledge space embeddings and/or adding a level of noise to the knowledge space embeddings.

As shown by reference number 120, the domain specific language model (e.g., the user device on which the domain specific language model is included) may provide the set of privatized embeddings to the collaborative knowledge system. Each domain specific language model, of the group of domain specific language models, may apply differential privacy to the set of knowledge space embeddings generated by the domain specific language model to generate a set of privatized embeddings and/or may provide the set of privatized embeddings to the centralized model in a manner similar to that described above.

Figure 1C:
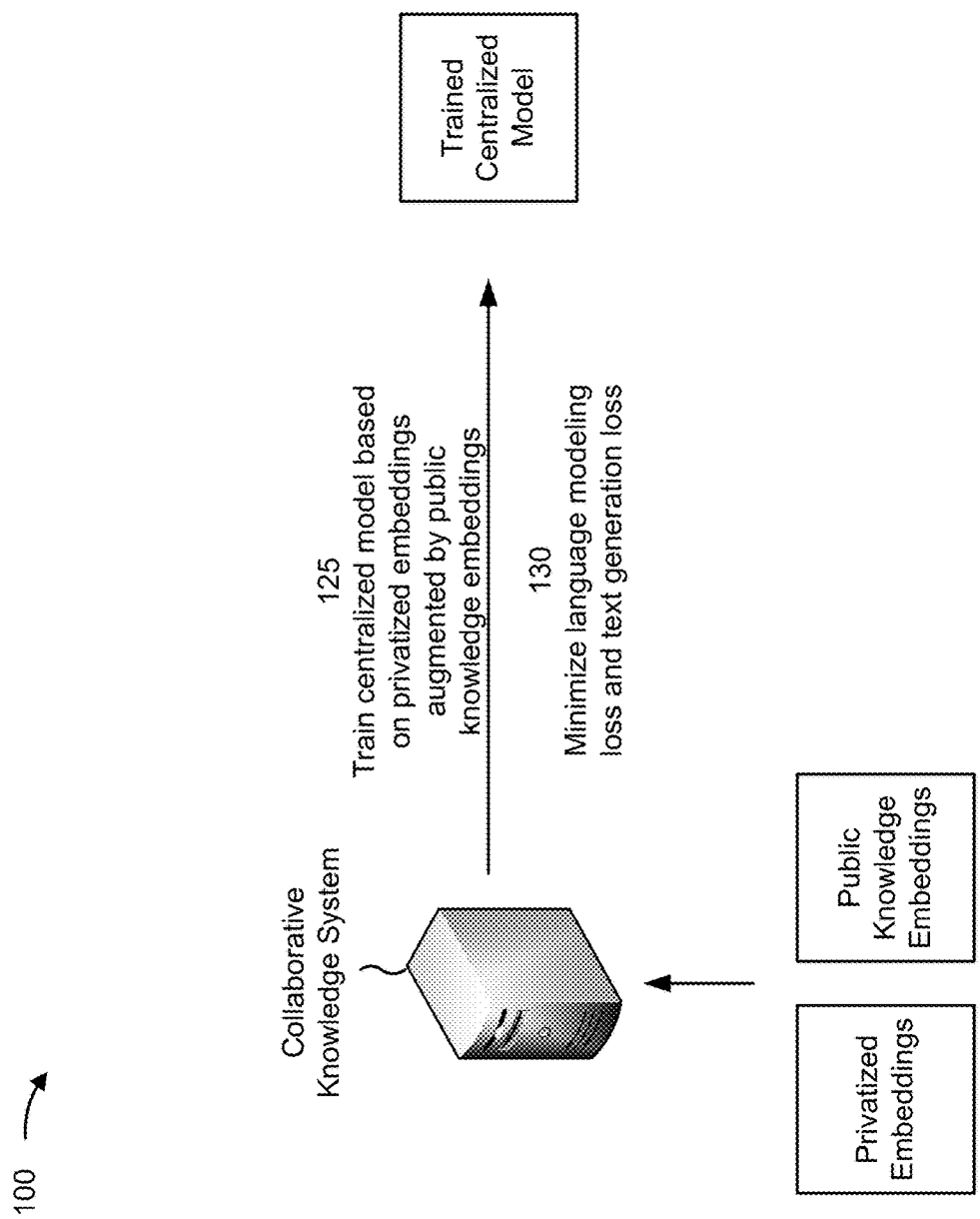

As shown in FIG. 1C, and by reference number 125, the collaborative knowledge system may train the centralized model based on sets of privatized embeddings received from multiple domain specific language models associated with different knowledge domains. For example, the collaborative knowledge system may train the centralized model based on a set of privatized embeddings received from a domain specific language model associated with a first knowledge domain and a set of privatized embeddings received from a domain specific language model associated with a second, different knowledge domain.

In some implementations, the centralized model may include a neural language model. The neural language model may include a model based on a neural network (e.g., a convolutional neural network (CNN) and/or a recurrent neural net language model (RNNLM), among other examples). In some implementations, the centralized model may include a transformer-based deep learning neural network architecture. For example, the central model may include an autoregressive language model that uses deep learning to produce text in response to a query.

In some implementations, the sets of privatized embeddings are augmented by public knowledge embeddings. The set of public embeddings may be generated based on publicly available information (e.g., information included in published documents and/or information included on a publicly accessible web page, among other examples).

As an example, the collaborative knowledge system may obtain publicly available information associated with one or more knowledge domains associated with the group of domain specific language models from a public knowledge database (e.g., a server device storing publicly available documents) and/or based on crawling a wide area network, such as the Internet, among other examples. The collaborative knowledge system may generate a set of embeddings based on the publicly available information. In some implementations, the collaborative knowledge system may generate the set of embeddings in a manner similar to that described above. The collaborative knowledge system may generate training data for training the centralized model based on the sets of privatized embeddings and/or the set of embeddings generated based on the publicly available information (referred to herein as the set of public embeddings).

A privatized embedding and/or a public embedding may include a feature set. The feature set may include a set of variables, and a variable may be referred to as a feature. A specific observation may include a set of variable values (or feature values) corresponding to the set of variables, as described above.

In some implementations, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation.

The target variable may represent a value that the centralized model is being trained to predict, and the feature set may represent the variables that are input to a trained centralized model to predict a value for the target variable. The set of observations may include target variable values so that the centralized model can be trained to recognize patterns in the feature set that lead to a target variable value. A machine learning model that is trained to predict a target variable value may be referred to as a supervised learning model.

In some implementations, the centralized model may be trained on a set of observations that do not include a target variable. This may be referred to as an unsupervised learning model. In this case, the centralized model may learn patterns from the set of observations without labeling or supervision, and may provide output that indicates such patterns, such as by using clustering and/or association to identify related groups of items within the set of observations.

In some implementations, the collaborative knowledge system may train the centralized model using the sets of privatized embeddings and/or public embeddings and using one or more machine learning algorithms, such as an NLP algorithm, a regression algorithm, a decision tree algorithm, a neural network algorithm, a k-nearest neighbor algorithm, and/or a support vector machine algorithm, among other examples. The collaborative knowledge system may train the centralized model to adapt the centralized model on each knowledge domain and to generate coherent text based on being adapted to each knowledge domain.

In some implementations, the collaborative knowledge system may train the centralized model to jointly optimize domain adaptation and language generation. For example, as shown by reference number 130, the collaborative knowledge system may train the centralized model based on contemporaneously minimizing language modeling loss and text generation loss.

In some implementations, the centralized model may include a sequence of learned self-attention mechanisms such that, by examining an output of the centralized model by analyzing the self-attention mechanisms and the input embeddings (e.g., the input privatized embeddings and/or the input public embeddings), the collaborative knowledge system can generate a list of relevant features that contributed to the output. In some implementations, the collaborative knowledge system may generate a score indicating a features importance to the output relative to other features.

The collaborative knowledge system may utilize the scores to determine the features associated with producing the output.

In some implementations, the collaborative knowledge system may determine that a feature associated with a highest score relative to other features the score may be a feature that contributes to the greatest change in the centralized model. The collaborative knowledge system may compute the score via a gradient of the feature (e.g., before calculating a softmax) by back-propagating the feature all the way back to the input. The collaborative knowledge system may aggregate all features associated with the attention mechanisms and all input features having a threshold level of relevance (e.g., all features associated with a score satisfying a score threshold) to a generated output to generate a collection of keywords.

In some implementations, the collaborative knowledge system may extract relevant input sentences from a reference corpus. The collaborative knowledge system may train the centralized model to process the collection of keywords and the extracted input sentences using one or more topic modeling techniques to produce summaries that explain an output of the centralized model (e.g., to generate additional information associated with a response to a query, as described in greater detail below).

After training, the collaborative knowledge system may store the centralized model as a trained centralized model to be used to analyze queries, as described elsewhere herein. Alternatively, and/or additionally, the collaborative knowledge system may obtain a trained centralized model from another device. In some implementations, the other device may train the centralized model in a manner similar to that described above.

Figure 1D:
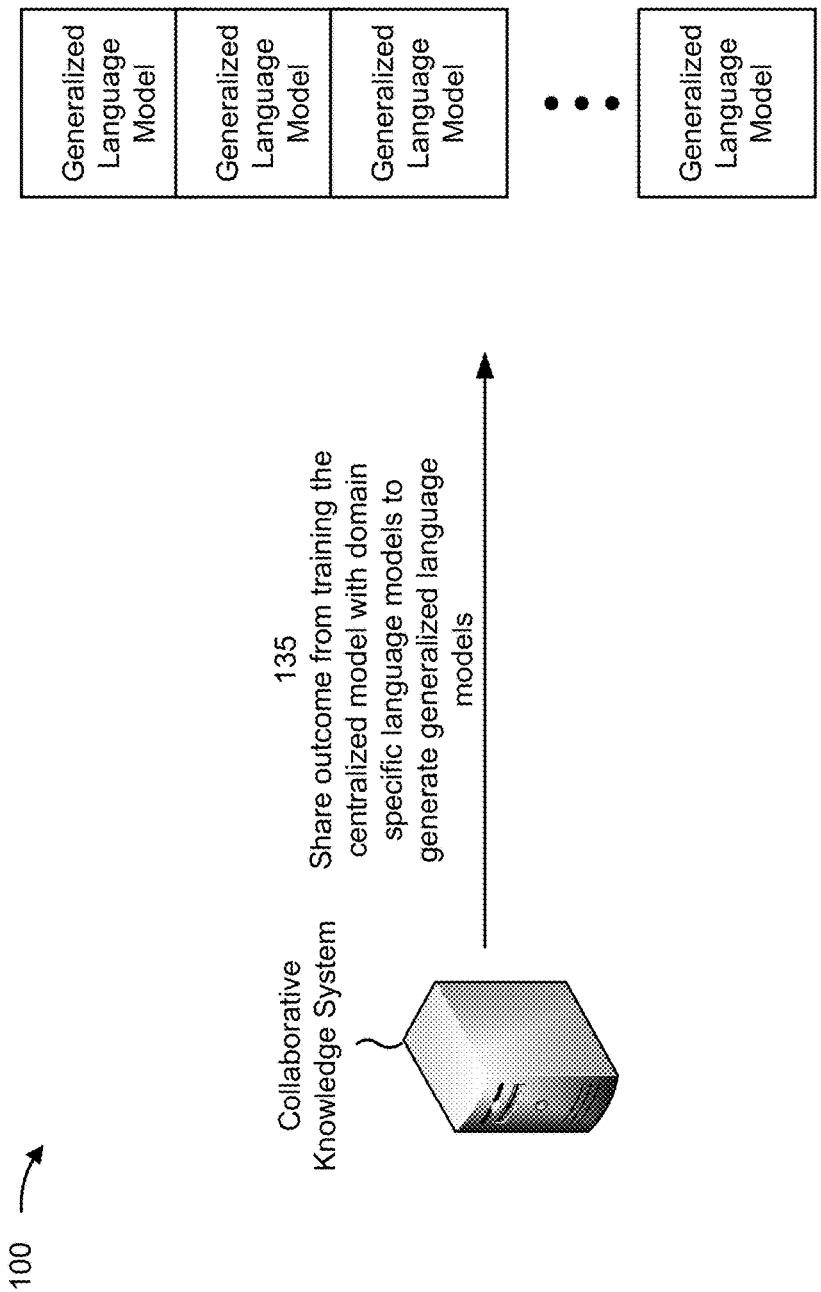

In some implementations, as shown in FIG. 1D, and by reference number 135, the collaborative knowledge system may share an outcome from training the centralized model with one or more domain specific language models to generate one or more generalized language models. In some implementations, the outcome from training the centralized model may include a set of weights associated with a neural network of the centralized model. A domain specific language model may receive the set of weights and may apply the set of weights to a neural network of the domain specific language model to generate the generalized language model.

Figure 1E:
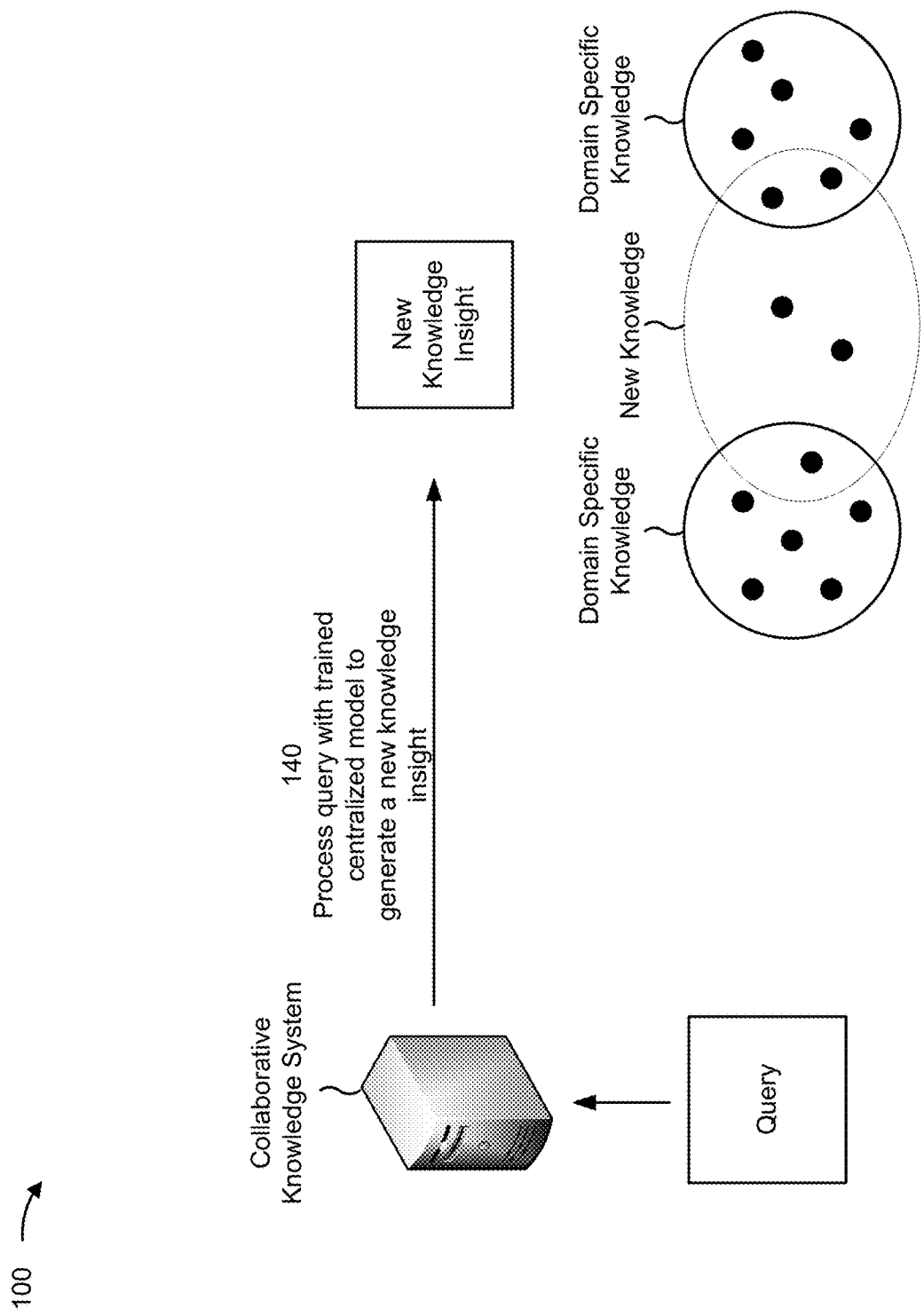

As shown in FIG. 1E, and by reference number 140, the collaborative knowledge system may receive a query and may process the query with the trained centralized model to generate a new knowledge insight. For example, a user (e.g., a knowledge worker) may query the centralized model by inputting text (e.g., free form text entered via an input field provided via a user interface). The collaborative knowledge system may apply the trained centralized model to the query (e.g., a new observation), such as by receiving the query input by the user and providing the query as an input to the trained centralized model. The collaborative knowledge system may apply the trained centralized model to the query to generate an output (e.g., a response to the query). The output may indicate a new knowledge insight generated by the centralized model by combining knowledge from multiple, separate knowledge domains.

As an example, a user may input (e.g., via a user interface associated with the collaborative knowledge system) a query. The query may indicate a question posed by the user. The collaborative knowledge system may provide the query to the centralized model as an input. The centralized model may process the query to determine a response (e.g., an answer to the question posed by the user). The response may include a new knowledge insight generated by the centralized model based on the centralized model being trained on the privatized embeddings associated with different knowledge domains.

Figure 1F:
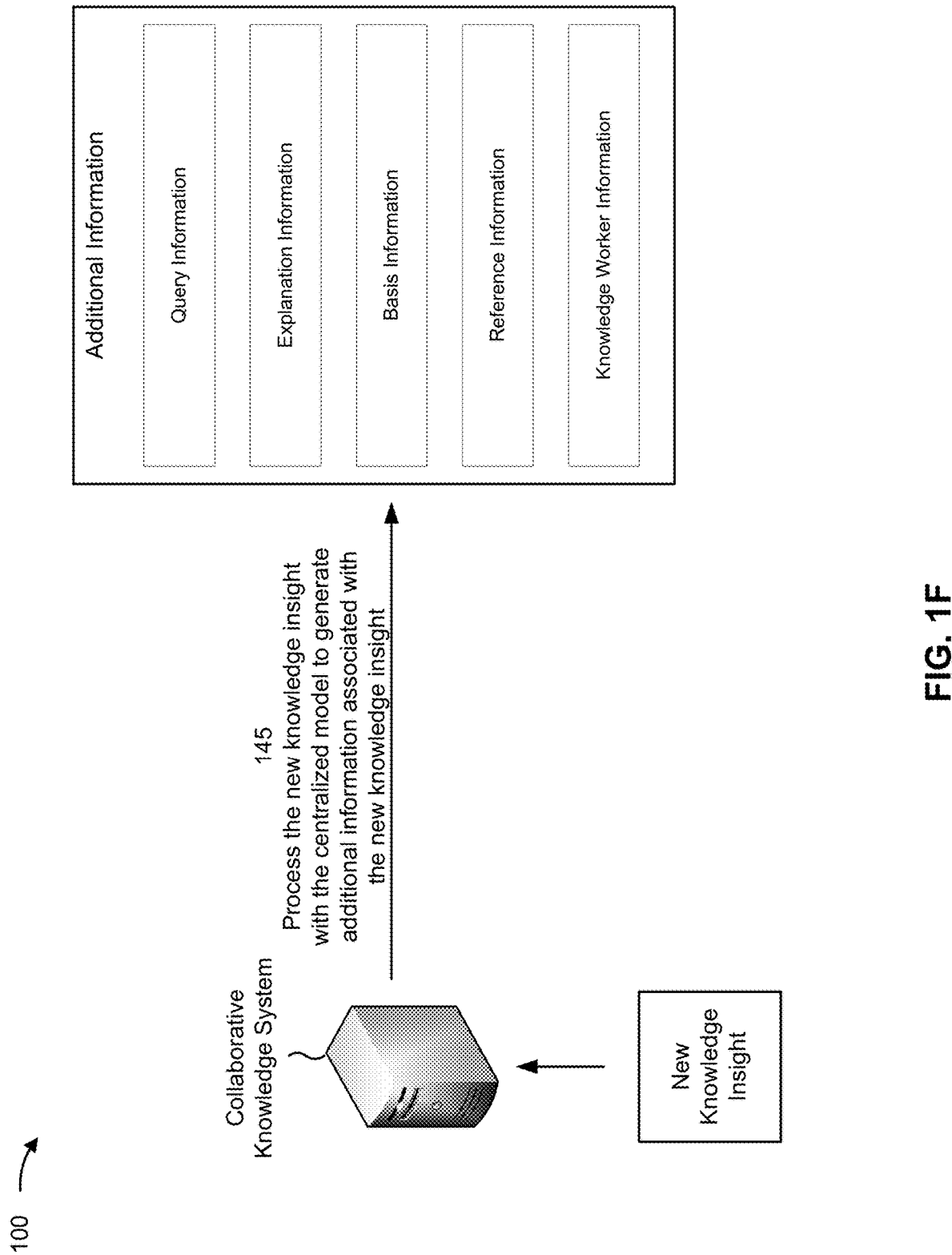

As shown in FIG. 1F, and by reference number 145, the collaborative knowledge system may process the new knowledge insight with the centralized model to generate additional information associated with the new knowledge insight. For example, the collaborative knowledge system may perform a reverse query by providing the new knowledge insight as an input to the centralized model. As shown in FIG. 1F, the additional information may include query information (e.g., information included in the query and/or information associated with the query (e.g., a time that the query was input and/or information identifying the user who input the query, among other examples), explanation information (e.g., a summary that includes information explaining the new knowledge insight), basis information (e.g., information explaining a basis (e.g., a set of facts and/or data) on which the new knowledge insight was generated), reference information (e.g., information identifying a document that includes information associated with the new knowledge insight (e.g., information describing a concept relevant to the new knowledge insight, information associated with scientific theories associated with the new knowledge concept, and/or the like), a link to the document, and/or bibliographic information associated with the new knowledge concept, among other examples), and knowledge worker information (e.g., information identifying a knowledge worker specializing in a knowledge domain associated with the new knowledge insight)).

As described above, the collaborative knowledge system may be tailored to a particular group of knowledge domains, an organization, and/or a particular project; may enable the sharing of information across a diverse set of knowledge areas; may generate new knowledge insights based on the shared information; may provide additional information explaining a context and/or a basis for the new knowledge insights; and/or may protect sensitive information.

Figure 1G:
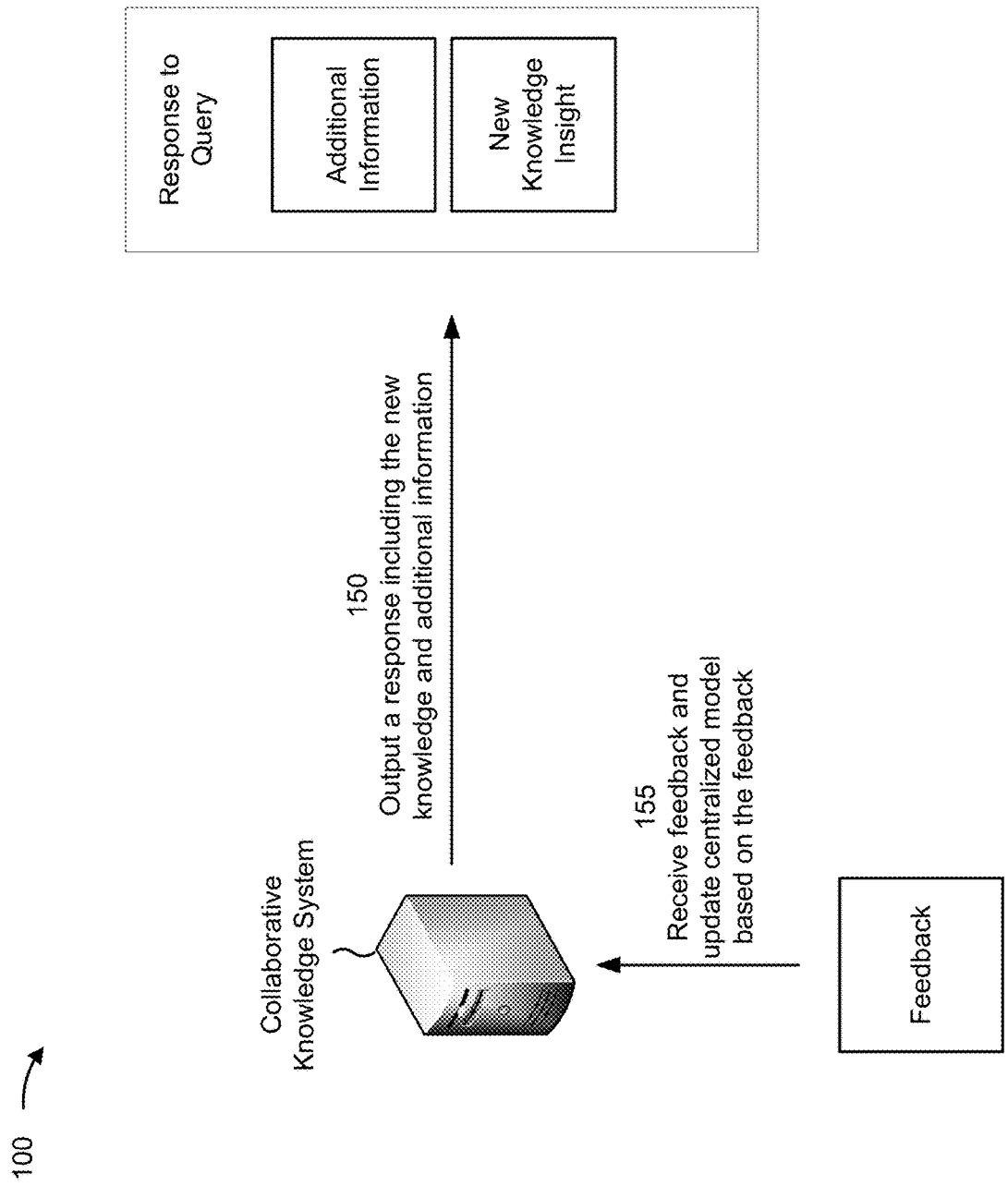

As shown in FIG. 1G, and by reference number 150, the collaborative knowledge system may output a response to the query that includes the new knowledge insight and the additional information. For example, the collaborative knowledge system may provide the response to a user device associated with the user providing the query, a user device associated with a knowledge worker specializing in a knowledge domain associated with the new knowledge insight, As shown in FIG. 1G, the response may include the new knowledge insight and the additional information output by the centralized model.

As shown by reference number 155, the collaborative knowledge system may receive feedback associated with the response and may update the centralized model based on the feedback. The feedback may include a score generated by the centralized model and/or a score input by a user (e.g., the user inputting the query and/or a knowledge worker specializing in a knowledge domain associated with the new knowledge insight, among other examples). The score generated by the centralized model and/or the score input by a user may indicate a coherency of the response (e.g., the new knowledge insight and/or the additional information) and/or a confidence level indicating an accuracy of the response based on the query. In some implementations, the system may retrain the centralized model based on the feedback.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
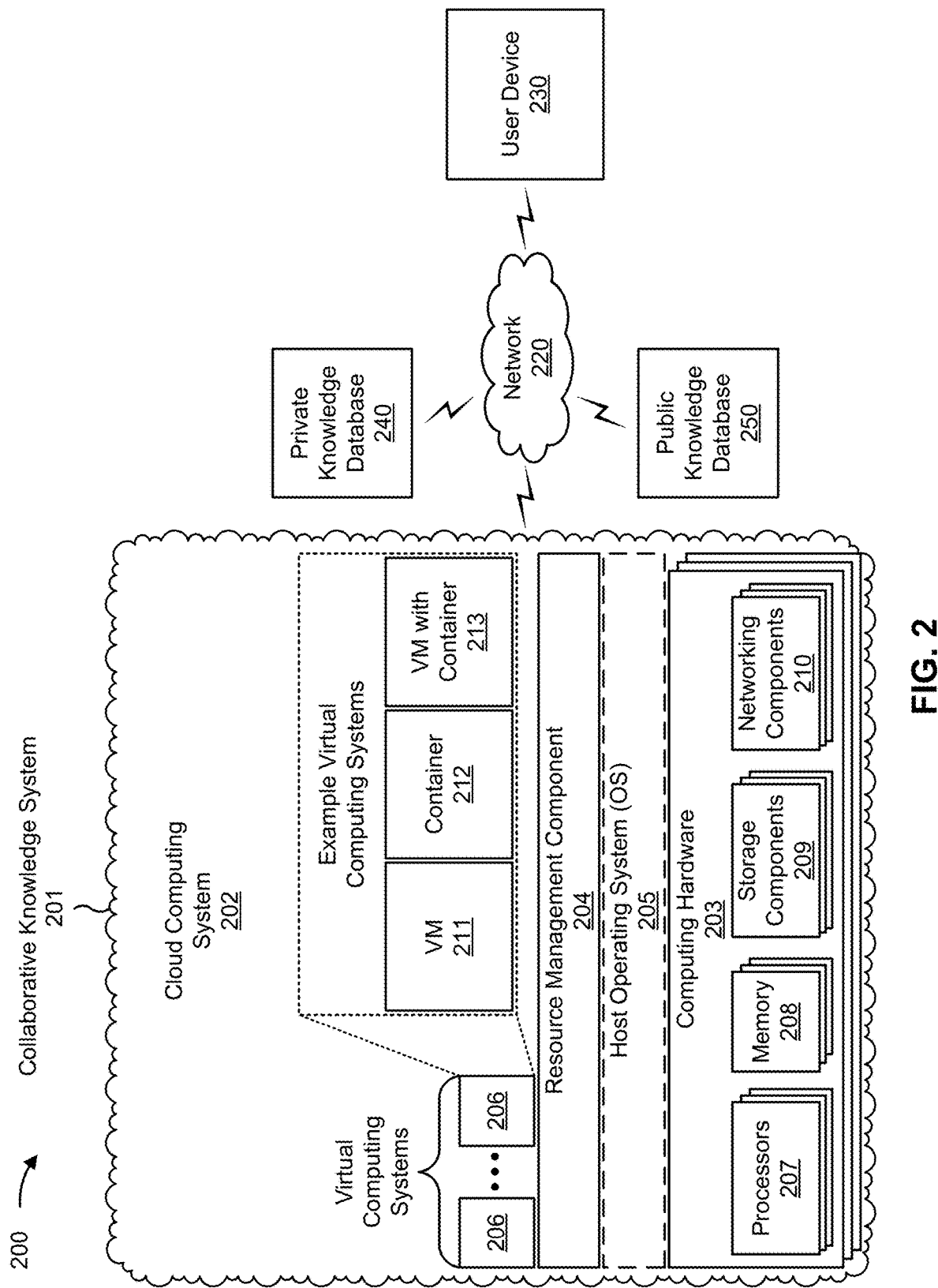
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a collaborative knowledge system 201, which may include one or more elements of and/or may execute within a cloud computing system 202. The cloud computing system 202 may include one or more elements 203-213, as described in more detail below. As further shown in FIG. 2, environment 200 may include a network 220, a user device 230, a private knowledge database 240, and/or a public knowledge database 250. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the collaborative knowledge system 201 may include one or more elements 203-213 of the cloud computing system 202, may execute within the cloud computing system 202, and/or may be hosted within the cloud computing system 202, in some implementations, the collaborative knowledge system 201 may not be cloud-based (e.g., may be implemented outside of a cloud computing system) or may be partially cloud-based. For example, the collaborative knowledge system 201 may include one or more devices that are not part of the cloud computing system 202, such as device 300 of FIG. 3, which may include a standalone server or another type of computing device. The collaborative knowledge system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The user device 230 includes one or more devices capable of receiving, generating, storing, processing, and/or providing information associated with synthesizing cross domain collective intelligence, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The private knowledge database 240 includes one or more devices capable of receiving, generating, storing, processing, and/or providing information associated with synthesizing cross domain collective intelligence, as described elsewhere herein. The private knowledge database 240 may include a communication device and/or a computing device. For example, the private knowledge database 240 may include the user device 230, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The private knowledge database 240 may communicate with one or more other devices of environment 200, as described elsewhere herein.

The public knowledge database 250 includes one or more devices capable of receiving, generating, storing, processing, and/or providing information associated with synthesizing cross domain collective intelligence, as described elsewhere herein. The public knowledge database 250 may include a communication device and/or a computing device. For example, the public knowledge database 250 may include the user device 230, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The public knowledge database 250 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
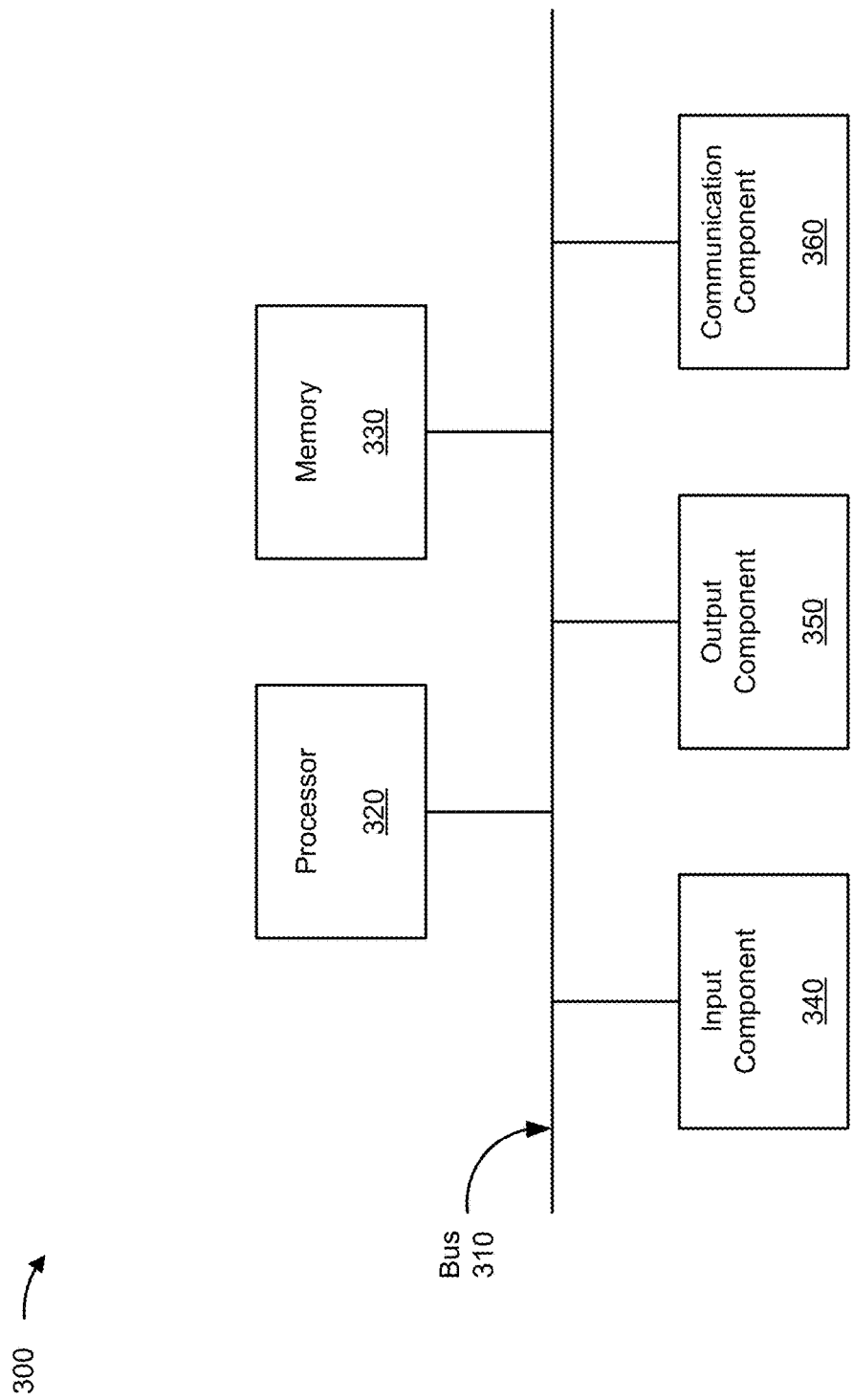
FIG. 3 is a diagram of example components of one or more devices of FIG. 2.

FIG. 3 is a diagram of example components of a device 300, which may correspond to the collaborative knowledge system 201, the user device 230, the private knowledge database 240, and/or the public knowledge database 250. In some implementations, the collaborative knowledge system 201, the user device 230, the private knowledge database 240, and/or the public knowledge database 250 may include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
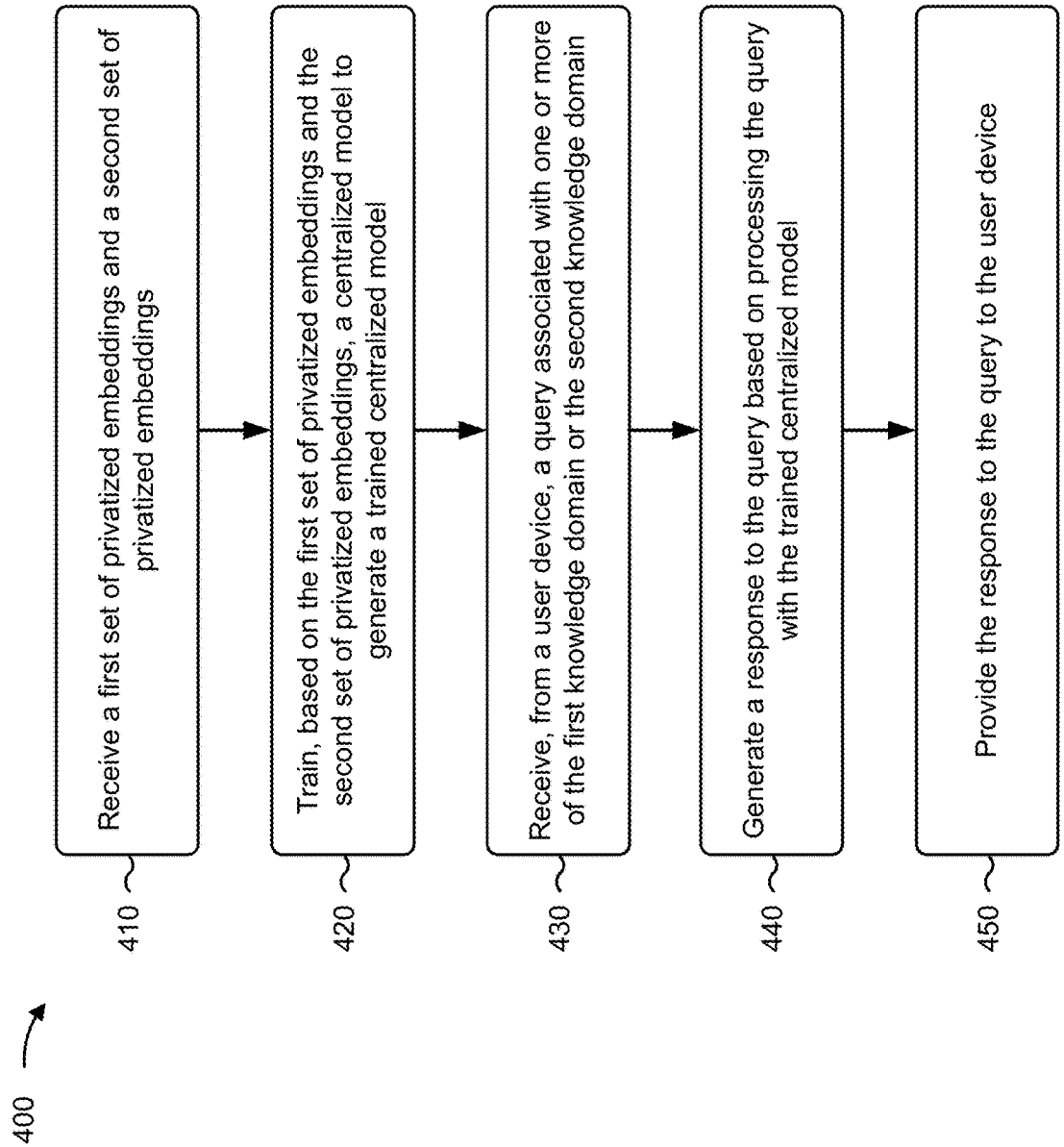
FIG. 4 is a flowchart of an example process relating to synthesizing cross domain collective intelligence.

FIG. 4 is a flowchart of an example process 400 associated with systems and methods for synthesizing cross domain collective intelligence. In some implementations, one or more process blocks of FIG. 4 may be performed by a system (e.g., the collaborative knowledge system 201). In some implementations, one or more process blocks of FIG. 4 may be performed by another device or a group of devices separate from or including the system, such as a user device (e.g., the user device 230), a private knowledge database (e.g., the private knowledge database 240), and/or a public knowledge database (e.g., the public knowledge database 250). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving a first set of privatized embeddings and a second set of privatized embeddings (block 410). For example, the system may receive a first set of privatized embeddings and a second set of privatized embeddings, as described above. In some implementations, the first set of privatized embeddings may be generated by a first local model based on a first set of private documents associated with a first knowledge domain. In some implementations, the second set of privatized embeddings may be generated by a second local model based on a second set of private documents associated with a second knowledge domain that is different from the first knowledge domain.

In some implementations, the first set of privatized embeddings may include a first vector space representation associated with the first set of private documents. The second set of privatized embeddings may include a second vector space representation associated with the second set of private documents. In some implementations, an initial set of embeddings may be generated based on the first set of private documents and a level of noise may be added to the initial set of embeddings to generate the first set of privatized embeddings. Similarly, an initial set of embeddings may be generated based on the second set of private documents and a level of noise may be added to the initial set of embeddings to generate the second set of privatized embeddings. The level of noise added to the initial set of embeddings generated based on the second set of private documents may be the same level of noise, or a different level of noise, than the level of noise added to the initial set of embeddings generated based on the first set of private documents.

As further shown in FIG. 4, process 400 may include training, based on the first set of privatized embeddings and the second set of privatized embeddings, a centralized model to generate a trained centralized model (block 420). For example, the system may train, based on the first set of privatized embeddings and the second set of privatized embeddings, a centralized model to generate a trained centralized model, as described above. In some implementations, the centralized model may be trained based on minimizing language modeling loss contemporaneously with minimizing text generation loss. In some implementations, the centralized model may be trained further based on a set of public embeddings generated based on publicly available information associated with one or more of the first knowledge domain or the second knowledge domain.

As further shown in FIG. 4, process 400 may include receiving, from a user device, a query associated with one or more of the first knowledge domain or the second knowledge domain (block 430). For example, the system may receive, from a user device, a query associated with one or more of the first knowledge domain or the second knowledge domain, as described above.

As further shown in FIG. 4, process 400 may include generating a response to the query based on processing the query with the trained centralized model (block 440). For example, the system may generate a response to the query based on processing the query with the trained centralized model, as described above.

In some implementations, the system may perform, utilizing the trained centralized model, a reverse query to determine additional information associated with the response. In some implementations, the reverse query may be performed based on a set of public documents. For example, the system may generate a set of public embeddings based on a set of public documents and the set of public embeddings may be used to train the centralized model. and the response may include the additional information. In some implementations, the response may include the additional information. For example, the response may include information indicating an answer to a question indicated in the query and information indicating a basis for the answer. The information indicating the basis for the answer may include information identifying a document that includes information associated with the answer, a link to the document, and/or a portion of the document, among other examples.

As further shown in FIG. 4, process 400 may include providing the response to the query to the user device (block 450). For example, the system may provide the response to the query to the user device, as described above.

In some implementations, the system may receive feedback associated with the response. The feedback may include a score generated by the centralized model and/or a score input by a user, among other examples. In some implementations, the system may retrain the centralized model based on the feedback.

In some implementations, the system may provide a set of embeddings associated with the centralized model to the first local model and/or the second local model. The first local model and/or the second local model may be retrained based on the set of embeddings associated with the centralized model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a system, a first set of privatized embeddings and a second set of privatized embeddings,
      wherein the first set of privatized embeddings are generated by a first local model based on a first set of private documents associated with a first knowledge domain, and
      wherein the second set of privatized embeddings are generated by a second local model based on a second set of private documents associated with a second knowledge domain that is different from the first knowledge domain;
   training, by the system and based on the first set of privatized embeddings and the second set of privatized embeddings, a centralized model to generate a trained centralized model;
   receiving, by the system and from a user device, a query associated with one or more of the first knowledge domain or the second knowledge domain;
   generating, by the system, a response to the query based on processing the query with the trained centralized model, wherein the response indicates a knowledge insight generated by combining knowledge from the first knowledge domain and the second knowledge domain; and
   providing, by the system, the response to the query to the user device.

2. The method of claim 1, wherein the first set of privatized embeddings includes a first vector space representation associated with the first set of private documents, and wherein the second set of privatized embeddings includes a second vector space representation associated with the second set of private documents.

3. The method of claim 1, wherein an initial set of embeddings is generated based on the first set of private documents, and wherein a level of noise is added to the initial set of embeddings to generate the first set of privatized embeddings.

4. The method of claim 1, wherein training the centralized model further comprises:
   training the centralized model further based on a set of public embeddings generated based on publicly available information associated with one or more of the first knowledge domain or the second knowledge domain.

5. The method of claim 4, further comprising:
   performing, utilizing the trained centralized model, a reverse query to determine additional information associated with the response,
      wherein the response includes the additional information.

6. The method of claim 1, wherein the response includes information indicating an answer to a question indicated in the query and information indicating a basis for the answer.

7. The method of claim 6, wherein the information indicating the basis for the answer includes one or more of:
   information identifying a document that includes information associated with the answer,
   a link to the document, or
   a portion of the document.

8. A system, comprising:
   one or more memories; and
   one or more processors, coupled to the one or more memories, configured to:
      receive a centralized model,
         wherein the centralized model is trained based on a first set of privatized embeddings and a second set of privatized embeddings,
         wherein the first set of privatized embeddings are generated by a first local model based on a first set of private documents associated with a first knowledge domain, and
         wherein the second set of privatized embeddings are generated by a second local model based on a second set of private documents associated with a second knowledge domain that is different from the first knowledge domain;
      receive, from a user device, a query associated with one or more of the first knowledge domain or the second knowledge domain;
      generate a response to the query based on processing the query with the centralized model, wherein the response indicates a knowledge insight generated by combining knowledge from the first knowledge domain and the second knowledge domain; and
      provide the response to the query to the user device.

9. The system of claim 8, wherein the centralized model is further trained based on a set of public embeddings, and wherein the set of public embeddings are generated based on publicly available information associated with one or more of the first knowledge domain or the second knowledge domain.

10. The system of claim 8, wherein the one or more processors are further configured to:
    perform, utilizing the centralized model and based on a set of public documents, a reverse query to determine additional information associated with the response; and provide the additional information to the user device.

11. The system of claim 8, wherein the one or more processors are further configured to:
    receive feedback associated with the response; and retrain the centralized model based on the feedback.

12. The system of claim 11, wherein the feedback includes a score generated by the centralized model and a score input by a user.

13. The system of claim 8, wherein the centralized model is trained based on minimizing language modeling loss contemporaneously with minimizing text generation loss.

14. The system of claim 8, wherein the one or more processors are further configured to:
    provide a set of embeddings associated with the centralized model to the first local model and the second local model,
    wherein the first local model and the second local model are retrained based on the set of embeddings associated with the centralized model.

15. A non-transitory computer-readable medium storing a set of instructions, the set of instructions comprising:
    one or more instructions that, when executed by one or more processors of a system, cause the system to:

receive a first set of privatized embeddings and a second set of privatized embeddings,
wherein the first set of privatized embeddings are generated by a first local model based on a first set of private documents associated with a first knowledge domain, and
wherein the second set of privatized embeddings are generated by a second local model based on a second set of private documents associated with a second knowledge domain that is different from the first knowledge domain; train, based on the first set of privatized embeddings and the second set of privatized embeddings, a centralized model to generate a trained centralized model;
receive, from a user device, a query associated with one or more of the first knowledge domain or the second knowledge domain;
generate a response to the query based on processing the query with the trained centralized model, wherein the response indicates a knowledge insight generated by combining knowledge from the first knowledge domain and the second knowledge domain; and
provide the response to the query to the user device.

16. The non-transitory computer-readable medium of claim 15, wherein the first set of privatized embeddings includes a first vector space representation associated with the first set of private documents, and wherein the second set of privatized embeddings includes a second vector space representation associated with the second set of private documents.

17. The non-transitory computer-readable medium of claim 15, wherein an initial set of embeddings are generated based on the first set of private documents, and wherein a level of noise is added to the initial set of embeddings to generate the first set of privatized embeddings.

18. The non-transitory computer-readable medium of claim 15, wherein the one or more instructions that, when executed by the system, cause the system to train the centralized model, further cause the system to:
train the centralized model further based on a set of public embeddings generated based on publicly available information associated with one or more of the first knowledge domam or the second knowledge domain.

19. The non-transitory computer-readable medium of claim 15, wherein the one or more instructions further cause the system to:
perform, utilizing the trained centralized model and based on a set of public documents, a reverse query to determine additional information associated with the response; and
provide the additional information to the user device.

20. The non-transitory computer-readable medium of claim 15, wherein the one or more instructions further cause the system to:
receive feedback associated with the response,
wherein the feedback includes a score generated by the trained centralized model and a score input by a user via the user device; and retrain
the trained centralized model based on the feedback.

* * * * *